Feb. 14, 1961    D. L. CRISWELL    2,972,107
VOLTAGE SENSITIVE TIMING DEVICE
Filed Jan. 4, 1960    2 Sheets-Sheet 1
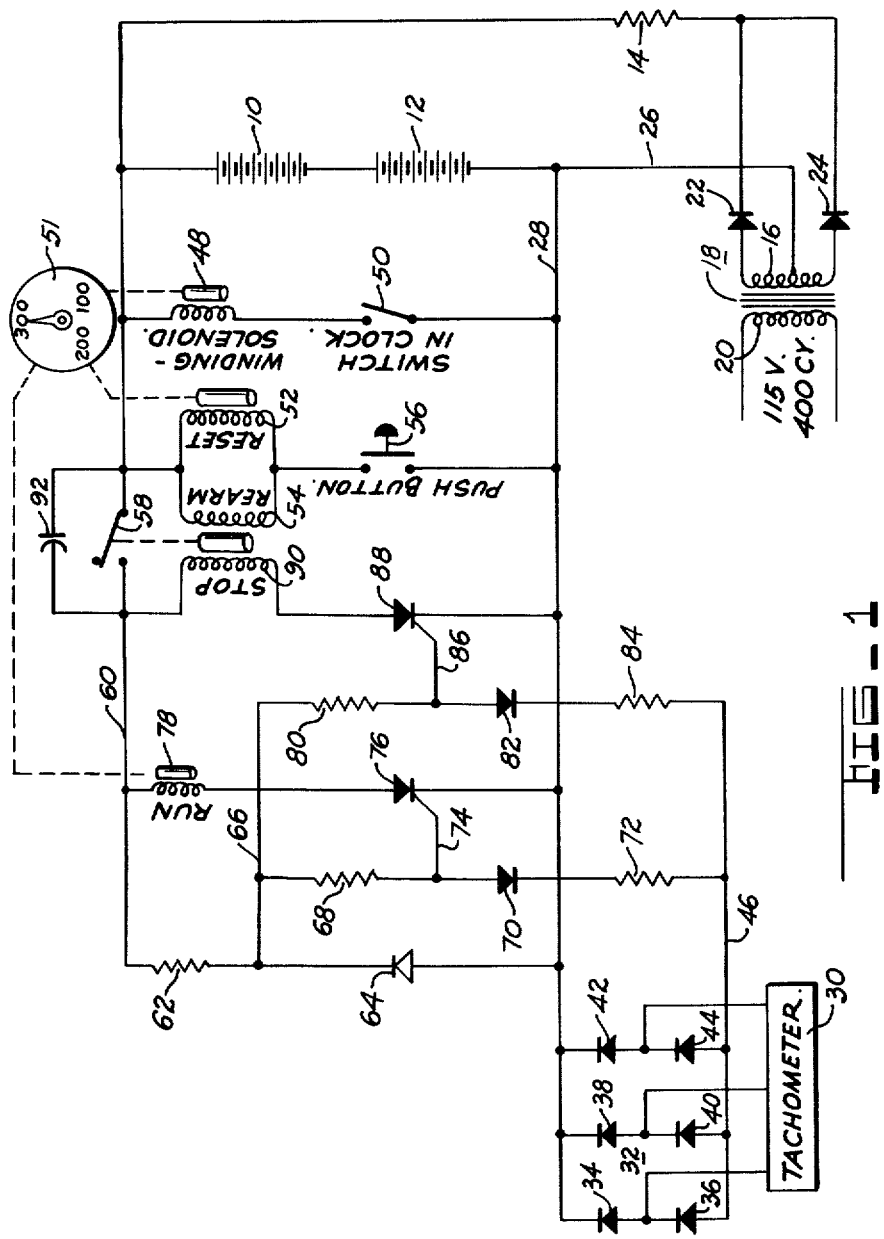
INVENTOR.
DARYL L. CRISWELL.
BY
Robert C. Smith
ATTORNEY.

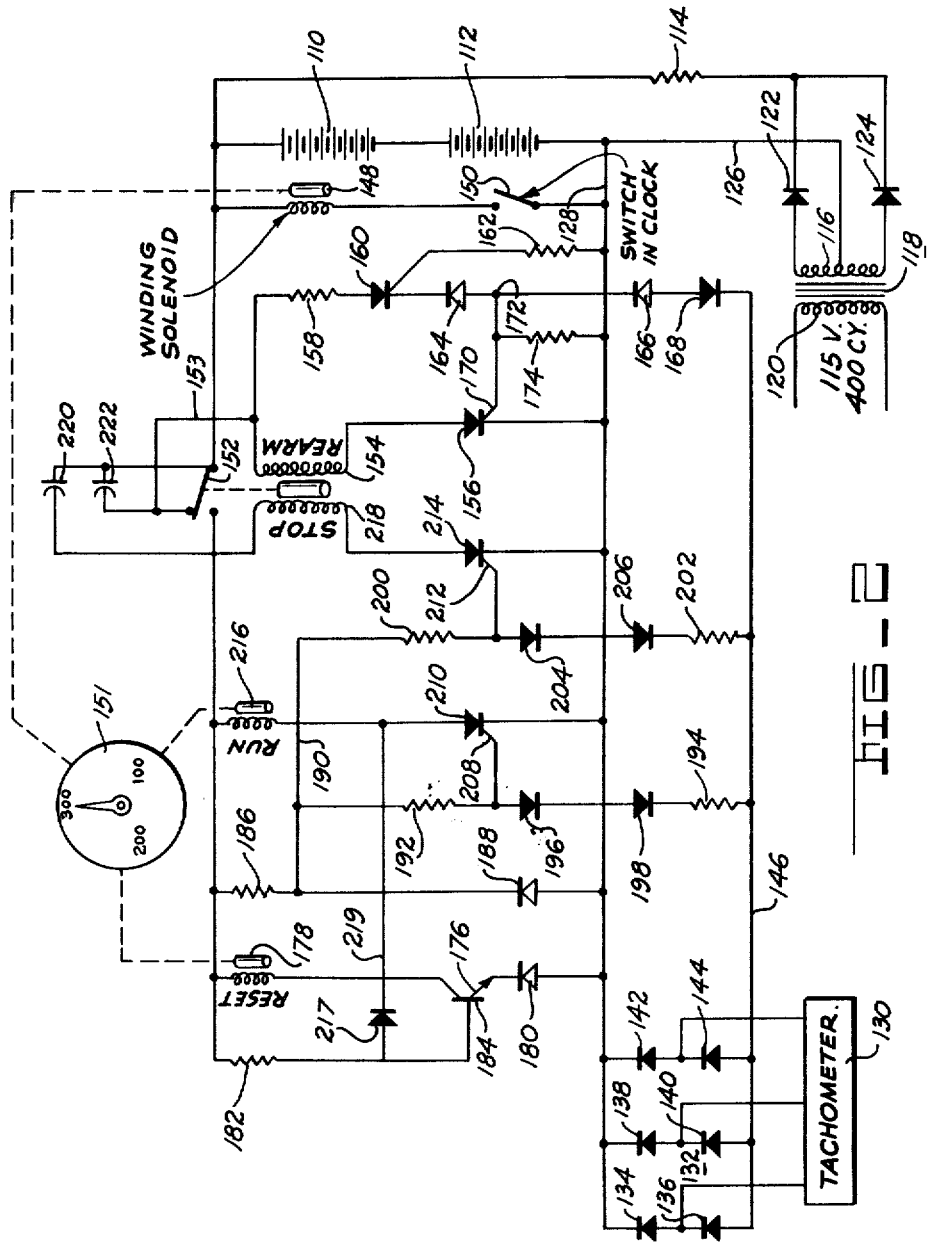

United States Patent Office 2,972,107
Patented Feb. 14, 1961

2,972,107

VOLTAGE SENSITIVE TIMING DEVICE

Daryl L. Criswell, South Bend, Ind., assignor to The Bendix Corporation, a corporation of Delaware Filed Jan. 4, 1960, Ser. No. 359

7 Claims. (Cl. 324—70)

This invention relates to timing devices and more specifically to a device responsive to the voltage level of a control signal responding to the speed of a gas turbine engine for determining the time required for the engine to run down from some speed to some lower speed.

The time required for a turbo jet engine to run down or coast down from an idling speed to zero speed has long been recognized as indicative of the general condition of the engine. For this reason the process of timing the coast down time of gas turbine engines has been incorporated into the regular operating procedure of such engines by the armed forces. The usual procedure has been for the pilot to work with a ground crewman on this task, the pilot signalling the ground crewman when he cuts the throttle and the ground crewman then observing the time required for the engine to come to a complete stop by means of a stop watch. It will be apparent that in spite of all efforts to standardize procedures, some error will creep into the results as a result of interpretative differences. Further, since this procedure normally requires a number of minutes, it occupies a significant amount of the time of a maintenance man when he could be occupied with other tasks. It is therefore an object of the present invention to provide a timing device for automatically registering the coast down time of gas turbine engines.

It is another object of the present invention to provide a timing device accomplishing the above object which is accurate over a set speed range and not subject to inaccuracies caused by interpretative error on the part of the pilot or other operator.

It is a further object of the present invention to provide a timing device accomplishing the above objects which is durable and comparatively simple in structure.

It is a further object of the present invention to provide an engine coast down timer which automatically times each deceleration of an engine from a set speed to a slower speed and leaves a cockpit indication of the previous coast down time.

It is a further object to provide an engine coast down timer which accomplishes the above object and which does not require any action on the part of the pilot or operator to initiate its operation.

Other objects and advantages will become apparent from the following specification taken in connection with the accompanying drawings in which:

Figure 1 is a schematic diagram of my engine run down time indicator having manual means for resetting the system for a new cycle; and Figure 2 is a schematic drawing of my engine run down time indicator including automatic means for resetting the timing device.

Referring now to Figure 1, a direct current voltage supply is shown as a pair of batteries 10 and 12 which are charged through a resistor 14 connected to a secondary winding 16 of a transformer 18 which may have its primary winding 20 supplied from a source of 400 cycle 115 volt alternating current. Each end of the secondary winding 16 is connected to the resistor 14, one end being connected through a diode 22 and the opposite end being connected through a diode 24. The center tap of the secondary winding 16 is connected to the negative end of battery 12 by means of a wire 26. This wire and the line 28 connected thereto is effectively the ground or common side of the power supply. Also, connected to the circuit of Figure 1 is a three phase tachometer generator 30 which is connected to a rectifier bank 32. The first phase of the tachometer is connected at the mid-point between a pair of diodes 34 and 36; the second phase of the tachometer is connected at the mid-point between diodes 38 and 40; and the third phase of the tachometer is connected at the mid-point between diodes 42 and 44. Tachometer 30 and the rectifier bank 32 are connected to the common or ground wire 28 and to a lead 46 in such manner that increasing engine speed will cause the voltage appearing on the wire 46 to be increasingly negative with respect to that of wire 28.

It will be observed that a number of circuits are connected across the voltage source 10, 12 including a winding solenoid 48 and a switch 50 which operate to wind the associated mechanical clock mechanism 51 in a manner well known in the art. The clock spring normally is arranged such that when it has run down to a certain extent, it trips the switch 50 thereby causing the clock spring to again be wound. Inasmuch as the mechanism of the clock itself is old and well known in the art and forms no real part of the present invention, it has not been shown herein. Also connected across the voltage source 10, 12 is a circuit including a "reset" winding 52, a parallel connected "rearm" winding 54 and a push button operated switch 56. With switch 56 open as shown, neither of windings 52 and 54 are energized and the latching relay 58 is held in the position shown thus maintaining all of the circuitry shown to the left side of relay 58 effectively deenergized. Closing of switch 56 will cause both of windings 52 and 54 to be energized, the winding 52 acting reset the associated clock to the zero time or start position and winding 54 acting to close relay 58. A typical mechanism normally associated with the "reset" winding 52 to effect movement of the hand of the clock mechanism back to the starting position includes a heart-shaped cam which may be rotated by the armature of solenoid 48 until the follower which positions the hand drops into the point of lowest rise as is well known in the prior art. Closing of the latching relay 58 causes the voltage 10, 12 to be impressed across a number of parallel paths between a wire 60 and the ground or common wire 28. One of these paths includes a resistor 62 and a zener diode 64 which acts to provide a fixed positive voltage between a wire 66 and the wire 28. A voltage dividing circuit consisting of a resistor 68, a diode 70 and a resistor 72 is connected between wires 66 and 46 and the control or "gate" element 74 of a controlled rectifier 76 is connected between the resistor 68 and the diode 70. As previously stated, the voltage potential of wire 46 with respect to wire 28 becomes progressively more negative as the engine speed increases and less negative as said speed decreases. At speeds above a normal engine idle speed or whatever speed is arbitrarily selected as that at which the computation of the run down time is to begin, the negative voltage on wire 46 is sufficiently great to hold the control element 74 at a value which keeps the controlled rectifying device 76 in an inactive condition. As the engine slows down to speeds below idle, and reaches the threshold value as established by the value of resistance in the voltage dividing circuit, the control element 74 reaches a value where it is sufficiently positive or has a sufficiently low negative value that it no longer is effective to block the flow of current through the controlled rectifier 76, The device 76 is shown as a PNPN semiconductor device of the type having negative resistance characteristics such that once the device is controlled by means of its control element such that it conducts, a regenerative action therein causes it to remain conducting until the voltage across it is removed. Other devices such as the combination of an NPN and the PNP transistor connected back-to-back may be used for this switching function. When the controlled rectifying device 76 is turned on, current flow is initiated through a winding 78 which causes the associated clock to begin running. A second voltage dividing network is connected between wires 46 and 66 which consists of a resistor 80, a diode 82 and a resistor 84. Connected between resistor 80 and diode 82 is the control element 86 of a controlled rectifying device 88 essentially similar to device 76. The values in this particular voltage dividing circuit are established such that when engine speed is further reduced to some very low desired value, the control element 86 reaches a voltage which results in turning on controlled rectifier 88 thereby causing conduction through a winding 90 which causes the latching relay 58 to be opened. When relay 58 is opened, current through the "run" winding 78 is interrupted and the associated clock stops registering elapsed time. A capacitor 92 is connected across the relay 58 to insure that enough current is available for winding 90 so that it completes the opening cycle. Diodes 70 and 82 provide temperature compensation for the gate to cathode temperature characteristics of the controlled rectifiers 76 and 88, respectively, and also for the zener diode 64.

Operation of the system just described is as follows: Assume that the batteries 10, 12 have been sufficiently charged by the power supply consisting of transformer 18 and its associated circuitry and that the engine is operating at idle speed with the switch 58 in the position shown. When the pilot or other operator closes switch 56 the reset winding 52 is energized causing the clock to register zero elapsed time and the rearm winding 54 is energized causing the latching relay 58 to be closed. This energizes the entire circuit; however, the speed of the engine as indicated by the tachometer is such that the negative potential on wire 46 is sufficiently high that both of controlled rectifiers 76 and 88 are maintained in a nonconducting condition. During the normal operation of the associated engine these rectifiers will remain turned off. When the operator cuts the throttle or otherwise causes the engine to be shut down, the speed as indicated by the tachometer will begin to drop and the negative voltage on wire 46 will become less and less until ultimately the speed value is such as to cause device 76 to be energized thereby energizing the "run" winding 78 and starting the associated clock 51. The clock will continue to operate and register elapsed time until some lower speed value is reached at which time the negative voltage potential on wire 46 is sufficiently low as to permit the control element 86 to cause conduction of the rectifying device 88 and the accompanying energization of the "stop" winding 90. This opens the relay 58 which deenergizes the "run" winding 78 thereby stopping the clock, leaving it registering a specific elapsed time interval.

Figure 2 shows an alternative version of my invention wherein additional features are provided which eliminate the need for operating a push button to rearm the circuit before each timing cycle. A direct current voltage source is supplied to the system from two batteries 110 and 112 which are connected through a resistor 114 to the secondary winding 116 of a power transformer 118. The primary winding 120 of the power transformer is connected to an alternating current source which may be 115 volt 400 cycle. The lower end of resistor 114 is shown connected to the upper end of secondary winding 116 through a diode 122 and the lower end of secondary winding 116 is connected to this same terminal through a diode 124. A wire 126 connects the center tap of secondary winding 116 to the opposite end of the battery 112. A line 128 connected to this same terminal is effectively the ground or common line for the circuit. A three phase alternating current tachometer 130 is connected to a rectifier bank 132 which provides full wave rectification for each of the three phases; one phase being connected to a pair of diodes 134 and 136, the second phase being connected to diodes 138 and 140 and the third phase being connected to diodes 142 and 144. With this arrangement as shown, the voltage on wire 146 becomes increasingly more negative with respect to the voltage on wire 128 with increases in engine speed. The Figure 2 embodiment includes the winding solenoid 148 and the clock switch 150 which are identical to those shown in Figure 1 for electrically winding the clock mechanism 151. Connected across the voltage source 110, 112 through a relay 152 and a wire 153 is a "rearm" winding 154 and a controlled rectifier device 156 which may be of the same type as devices 76 and 88 of Figure 1. Also connected to wire 153 through a resistor 158 is a second controlled rectifying device 160 similar to device 156 which has its controlled element connected to the common or ground wire 128 through a resistor 162. Device 160 is also connected through zener diodes 164 and 166 and a diode 168 to the speed signal wire 146. The control element 170 of controlled rectifier 156 is connected to a junction 172 between diodes 164 and 166 and also across a resistor 174 to the ground line 128. After the engine has been started, there will be in line 146 a voltage which is substantially negative with respect to that of line 128. With increasing speed, this signal increases until it is large enough to exceed the breakdown voltage of the zener diodes 164 and 166, thereby causing current to flow in the control circuit of device 160 thereby turning it on. At this point, control element 170 of rectifying device 156 has a negative voltage on it and during the time that the engine is operated at substantial speed this voltage will remain sufficiently negative that device 156 will remain turned off. As the speed of the engine is reduced below idle speed, the negative voltage on control element 170 decreases until a voltage is reached where device 156 is turned on thereby energizing the rearm winding 154 and causing relay 152 to be moved to the opposite terminal from that illustrated. The immediate result of closing relay 152 is to place voltage 110, 112 across a plurality of circuits including that containing the transistor 176, a winding 178 which is effective to reset the hands of the associated clock to zero position through means described above, and a zener diode 180. Effectively connected in parallel with winding 178 is a resistor 182 which is connected to the base 184 of the transistor 176. This substantial voltage drop will immediately be effective to break down the zener diode 180 thereby causing current flow through the reset winding 178 and resetting the hands of the associated clock to show zero elapsed time. Also connected across the voltage source 110, 112 is a reference circuit consisting of a resistor 186 and a zener diode 188. The diode 188 acts to maintain a substantially constant voltage level between the ground wire 128 and a wire 190 which is connected to two voltage dividing circuits; the first including resistors 192 and 194 and diodes 196 and 198; and the second including resistors 200 and 202 and diodes 204 and 206. Connected in the first voltage dividing circuit between resistor 192 and diode 196 is the control element 208 of a controlled rectifier 210 and connected to the second voltage dividing circuit between resistor 200 and diode 204 is the control element 212 of the controlled rectifying device 214. Both of these rectifying devices may be the same type as devices 156 and 160, previously described. The total voltage drop across these voltage dividing circuits must necessarily equal the voltage across the regulating zener diode 188 plus the negative voltage which is generated as a function of the speed of the tachometer 130, which appears on wire 146.

As the engine continues to slow down, the voltage on wire 146 becomes progressively less negative with respect to that of wire 128 and the control element 208 of rectifying device 210 also becomes continually less negative until device 210 is turned on thereby causing current to flow through device 210 and through the "run" winding 216 thereby causing the associated clock to begin registering elapsed time. When the "run" winding 216 is energized, the voltage drop across rectifying device 210 becomes very small and current is caused to flow through a diode 217 and the associated wire 219 and through the device 210 to the wire 128. This causes the voltage drop across zener diode 180 to be reduced to less than the threshold determined by the base-emitter characteristic of transistor 176 which results in deenergizing the reset winding 178.

At a somewhat lower engine speed, perhaps approaching zero, the voltage on wire 146 will be of a sufficiently low negative value to cause the control element 212 to turn on the controlled rectifying device 214 thereby energizing the "stop" winding 218 which causes the relay 152 to be returned to the position illustrated. The capacitors 220 and 222 are for the purpose of prolonging the pulse applied to the coils 218 and 154 respectively to insure the transfer from one condition to another since the windings effectively open their own power circuits. The diodes 196, 198, 204 and 206 provide temperature compensation for the temperature characteristics of devices 210 and 214 and for the temperature characteristic of the Zener diode 188.

When the associated engine is started, a voltage which is negative with respect to the ground line 128 is developed in winding 146 proportional to this engine speed and as the speed increases, this voltage ultimately becomes large enough to break down the Zener diodes 164 and 166 thereby causing current to flow through the rectifying device 160, turning it on. When the engine begins decelerating as a resultt of a command from the pilot or operator, the negative voltage on wire 146 becomes progressively lower and at some point a voltage is reached where control element 170 turns rectifying device 156 on thereby energizing the "rearm" winding 154 and causing the relay 152 to be closed. The immediate result of this is to cause current flow through the transistor 176 and to energize the "reset" winding 178 thereby returning the hand of the associated clock mechanism 151 to show zero elapsed time. As soon as the engine has coasted down to the upper of the two speeds over which the timed range is to extend, the negative voltage on wire 146 is sufficiently low that it causes the control element 208 to turn on the rectifying device 210 thereby energizing the "run" winding 216. This causes the "reset" winding 178 to be deenergized and the clock begins to run. At the lower of the two limits, the control element 212 receives a sufficiently low negative voltage to cause conduction through the rectifying device 214 thereby energizing the "stop" winding 218 and causing the relay 152 to be moved to the open position, as illustrated. The clock 151 is therefore stopped at a position showing the elapsed time for the deceleration from the first of the two speeds desired to the second of these speeds. On a subsequent starting and operating of the engine, the entire cycle will be repeated, the relay 152 being closed at a desired engine speed thereby causing the "reset" winding 178 to turn the hands of the associated clock back to zero and the remainder of the system operating as described to determine the elapsed time for the deceleration from the first engine speed to the second.

While only two embodiments have been shown and described herein, it is recognized that modifications may be made to suit the requirements of any given application without departing from the scope of the present invention.

I claim:

1. A device for timing the transition in speed of a rotating member from a first rotational speed to some lower second rotational speed including a clock device and means for controlling the operation of said clock device comprising a source of substantially constant direct current voltage of a first polarity, a source of direct current voltage of the opposite polarity which varies in magnitude with the instantaneous rotational speed of said member, a relay, a first circuit connected across said first named source including in series a switching device and two windings connected in parallel for simultaneous energization, one of which when energized acts to reset said clock device to indicate zero elapsed time and the other which when energized acts to close said relay, a second voltage regulating circuit including a zener diode connected across said first named voltage source, a third circuit connected across said first named source including a controlled rectifier having a control element and a winding which when energized starts said clock device, a fourth circuit connected across said first named source including a controlled rectifier having a control element and a winding which when energized opens said relay to stop said clock device, and first and second voltage dividing circuits connected across said Zener diode and said second named voltage source, said first voltage dividing circuit including a diode and a connection to said first named control element to cause its controlled rectifier to conduct when the voltage on said control element is representative of said first rotational speed, and said second voltage dividing circuit including a diode and a connection to said second named control element to cause its controlled rectifier to conduct when the voltage on said control element is representative of said second rotational speed of said member.

2. A device for timing the transition in speed of a rotating member from a first rotational speed to some lower second rotational speed including a clock device and means for controlling the operation of said clock comprising a source of substantially constant direct current voltage of a first polarity, a source of direct current voltage of the opposite polarity which varies in magnitude with the instantaneous rotational speed of said member, a relay connected to said first named source, a first circuit connected across said first named source including, switching means and a winding for closing the contacts of said relay, a second circuit including a voltage regulating zener diode connected across said first named voltage source, a third circuit connected across said first named voltage source including a controlled rectifier having a control element and a winding which when energized starts said clock device, a fourth circuit connected across said first named voltage source including a controlled rectifier having a control element and a winding which, when energized opens the contacts of said relay and deenergizes said second, third and fourth circuits, and a first voltage dividing circuit connected across said zener diode and said second named voltage source including a diode and the control element for said first named controlled rectifier to cause said controlled rectifier to conduct when the voltage on said control element is representative of said first rotational speed, and a second voltage dividing circuit connected across said zener diode and said second named voltage source including a diode and the control element for said second named controlled rectifier to cause said controlled rectifier to conduct when the voltage on said control element is representative of said second rotational speed.

3. A device for timing the transition in speed of a rotating member from a first rotational speed to some lower second rotational speed including a clock device and means for controlling the operation of said clock device comprising a source of substantially constant direct current voltage of a first polarity, a source of direct current voltage of the opposite polarity which varies in magnitude with the instantaneous rotational speed of said member, a relay connected to said first named source, a first circuit connected across said first named source including switching means and a winding for closing the contacts of said relay, a second circuit including a voltage regulating zener diode connected across said first named voltage source, a third circuit connected across said first named voltage source including a controlled rectifier having a control element and a winding which when energized starts said clock device, a fourth circuit connected across said first named voltage source including a controlled rectifier having a control element and a winding which, when energized opens the contacts of said relay to stop said clock device, means connected to said second voltage source and to said first named control element to cause its corresponding controlled rectifier to conduct when said second voltage is indicative of said first rotational speed, and means connected to said second voltage source and to said second named control element to cause its corresponding controlled rectifier to conduct when said second voltage is indicative of said second rotational speed.

4. A timing device as set forth in claim 2 wherein said switching means in said first circuit includes a controlled rectifier in series with said relay winding and a circuit connected across said first and second named voltages including a controlled rectifier, means responsive to the magnitude of said second named voltage for causing said controlled rectifier to conduct, and zener diode means connected to the control element of said third named controlled rectifier for establishing the rotational speed of said member at which said relay closing winding is energized.

5. A device for timing the transition in speed of a rotating member from a first rotational speed to some lower second rotational speed including a clock device and means for controlling the operation of said clock device comprising a source of substantially constant direct current voltage of a first polarity, a source of direct current voltage of the opposite polarity which varies in magnitude with the instantaneous speed of said member, a relay connected to said first named voltage source, a first circuit connected across said first named source including a winding for closing the contacts of said relay and a controlled rectifier having a control element, a circuit connected across said first and second named sources including a second controlled rectifier, the control element of said first named controlled rectifier, a zener diode for preventing conduction through said second control rectifier until the speed of said rotating member has reached a desired value, and the control element of said first named controlled rectifier which keeps said rectifier turned off during the time the second named voltage is indicative of normal operating speeds of the associated engine and which turns said rectifier on thus energizing said relay when said engine speed has been reduced to a desired value; a second circuit connected across said first named source and energized upon the energizing of said relay including a transistor amplifier, a zener diode and a reset winding for resetting said clock device to show zero elapsed time; a third circuit including a voltage regulating zener diode connected across said first named voltage source; a fourth circuit connected across said first named voltage source including a third controlled rectifier having a control element and a winding which when energized starts said clock device; a fifth circuit connected across said first named voltage source including a fourth controlled rectifier having a control element and a winding which, when energized, opens the contacts of said relay to stop said clock device; a first voltage dividing circuit connected across said voltage regulating zener diode and said second named voltage source including a diode and the control element for said third controlled rectifier to cause said controlled rectifier to conduct when the voltage on said control element is representative of said first rotational speed; and a second voltage dividing circuit connected across said zener diode and said second named voltage source including a diode and the control element of said fourth controlled rectifier to cause said controlled rectifier to conduct when the voltage on said control element is representative of said second rotational speed.

6. A device for timing the transition in speed of a rotating member from a first rotational speed to some lower second rotational speed including a clock device and means for controlling the operation of said clock device comprising a source of substantially constant direct current voltage of a first polarity, a source of direct current voltage of the opposite polarity which varies in magnitude with the instantaneous rotational speed of said member, a relay connected to said first named voltage source, a first circuit connected across said first named source including means for closing the contacts of said relay and switching means connected across said first and second named sources for energizing said means when said engine speed has been reduced to a desired value, a second circuit connected across said first named source and energized upon closing said contacts including switching means and electro-responsive means for resetting said clock device to a desired position, a third voltage regulating circuit connected across said first named voltage source, a fourth circuit connected across said first named voltage source including a second electro-responsive device for starting said clock device and switching means for controlling flow through said electro-responsive device, a fifth circuit connected across said first named voltage source including a third electro-responsive device for opening the contacts of said relay to stop said clock device and switching means for controlling flow through said electro-responsive device, means connected to said second named voltage source for energizing the switching means in said fourth circuit when said second named voltage is representative of said first rotational speed and for energizing the switching means in said fifth circuit when said second named voltage is representative of said second rotational speed.

7. A device for timing the transition in speed of a rotating member from a first rotational speed to some lower second rotational speed including a clock device and means for controlling the operation of said clock device comprising a source of substantially constant direct current voltage of a first polarity, a source of direct current voltage of the opposite polarity which varies in magnitude with the instantaneous speed of said member, a relay connected to said first named voltage source, and a plurality of circuits connected across said first named source including a first circuit having electro-responsive means for closing the contacts of said relay and switching means for energizing said electro-responsive means, a second circuit including voltage regulating means, a third circuit including a second electro-responsive means for starting said clock device and a first switching device for controlling the flow through said third circuit, a fourth circuit including a third electro-responsive means which, when energized, opens the contacts of said relay to stop said clock device and a second switching device for controlling the flow through said fourth circuit, means connected to said second named voltage source for causing said first switching device to conduct when said second named voltage is representative of said first rotational speed and for causing said second switching device to conduct when said second named voltage is representative of said second rotational speed.

References Cited in the file of this patent

UNITED STATES PATENTS

| | | |
|---|---|---|
| 2,576,415 | Prather | Nov. 27, 1951 |
| 2,577,408 | Dobson | Dec. 4, 1951 |
| 2,651,022 | Shelly | Sept. 1, 1953 |